United States Patent [19]

Uchida et al.

[11] Patent Number: 4,485,772

[45] Date of Patent: Dec. 4, 1984

[54] AUTOMATIC ENGINE STOP-RESTART SYSTEM

[75] Inventors: Shigekatsu Uchida, Owariasahi; Takao Akatsuka, Togocho; Takahide Kawamura, Okazaki, all of Japan

[73] Assignee: Toyota Jidosha Kogyo Kabushiki Kaisha, Aichi, Japan

[21] Appl. No.: 388,991

[22] Filed: Jun. 16, 1982

[30] Foreign Application Priority Data

Jul. 27, 1981 [JP] Japan .................. 56-117251

[51] Int. Cl.³ .............................................. F02D 29/02
[52] U.S. Cl. ........................... 123/179 B; 123/198 D; 123/198 DB; 123/198 DC
[58] Field of Search ................ 123/198 DB, 198 DC, 123/198 D, 179 B, 179 BG, 179 A; 180/54 R; 307/10 R; 374/144; 340/52 F

[56] References Cited

U.S. PATENT DOCUMENTS

| | | | |
|---|---|---|---|
| 3,229,792 | 1/1966 | Hock | 123/179 A |
| 3,872,316 | 3/1975 | Kurii et al. | 123/179 B |
| 3,911,373 | 10/1975 | Ohtake et al. | 340/52 F |
| 3,944,969 | 3/1976 | Arai et al. | 340/52 F |
| 4,136,329 | 1/1979 | Trobert | 340/52 F |
| 4,231,073 | 10/1980 | Suchko | 123/179 B |
| 4,327,352 | 4/1982 | Cerruti | 340/52 F |

Primary Examiner—Andrew M. Dolinar
Attorney, Agent, or Firm—Oblon, Fisher, Spivak, McClelland & Maier

[57] ABSTRACT

An engine is automatically stopped under predetermined conditions, thereafter, automatically restarted under other predetermined conditions, and a primary check indicating device for indicating abnormal conditions in various components of a vehicle is forcedly turned OFF at least when the engine is automatically stopped. The primary check indicating device includes, for example, a charge warning lamp for indicating abnormality in the generating condition, an oil pressure lamp for indicating abnormality in the pressure of lubricating oil and an exhaust gas temperature lamp for indicating abnormality in the temperature of exhaust gas.

3 Claims, 4 Drawing Figures

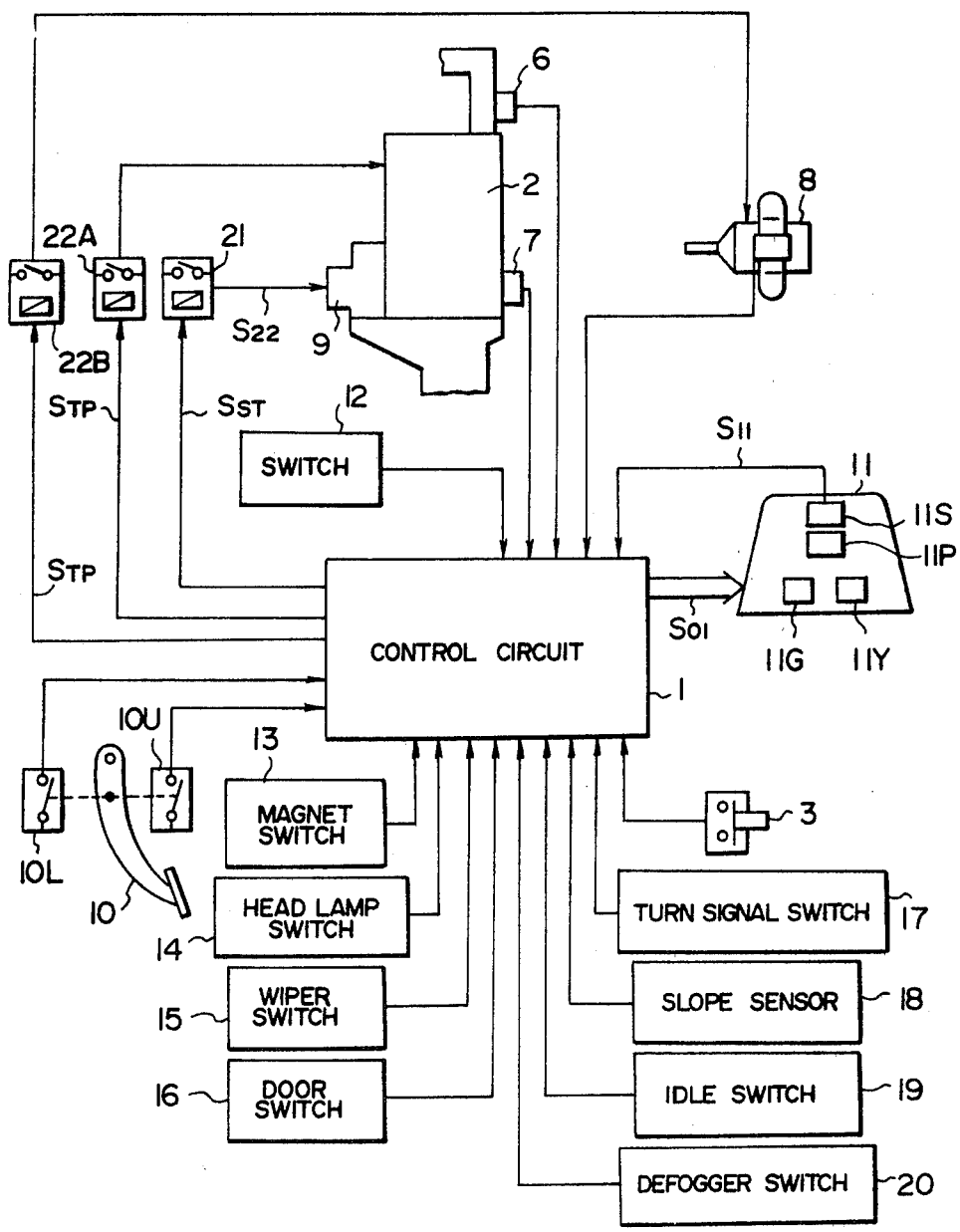

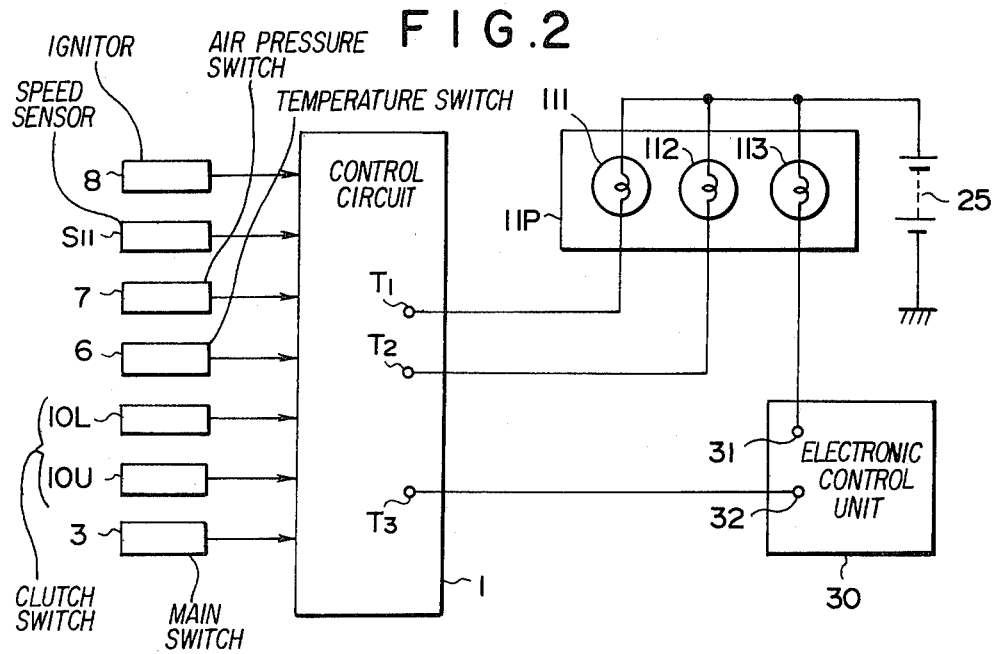
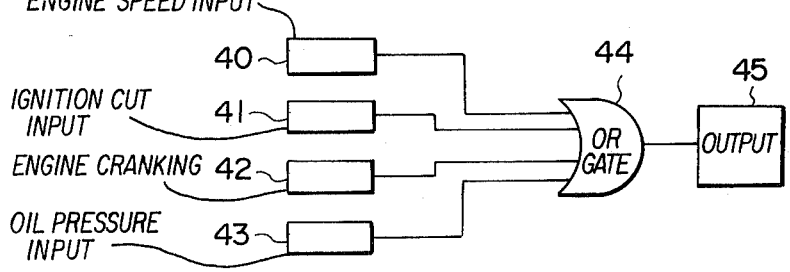
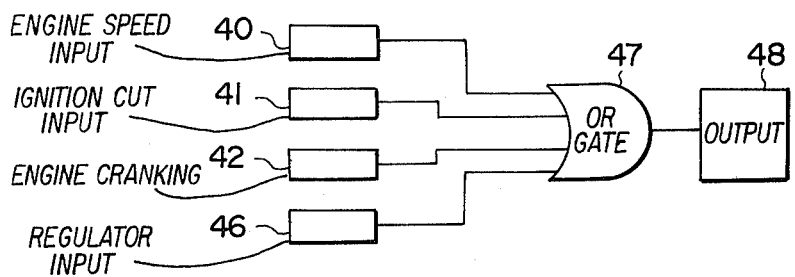

AUTOMATIC ENGINE STOP-RESTART SYSTEM

BACKGROUND OF THE INVENTION

This invention relates to an automatic engine stop-restart system, and more particularly to an automatic engine stop-restart system wherein a primary check indication is not made when an engine is automatically stopped.

In general, there are many cases where, during driving of a motor vehicle, the motor vehicle is required to be temporarily stopped due to various causes including a traffic jam and a red traffic light. In the case of temporary stop as described above, it is the common practice that, until the motor vehicle can move again, the motor vehicle is in the waiting state, idling the engine. When the temporary stops as described above are frequent, the fuel consumption rate is deteriorated and it is unfavorable from the viewpoint of the emission control. Then, each time of the temporary stop, the engine is manually stopped by means of a key switch, and, in moving the vehicle, the engine is manually started, thus enabling to solve the above-described problem. However, these manual operations suffer from low controlability and it is not favorable from the viewpoint of the safety control.

In view of the above-described facts, there has been proposed an automatic engine stop-restart system (hereinafter referred to as "EASS") wherein, in temporarily stopping the motor vehicle, the engine is automatically stopped, and thereafter, the engine is automatically restarted. In this EASS, for example, a status signal of a clutch pedal, an engine rotational speed signal, a vehicle speed signal, a water temperature signal, an oil pressure signal and other signals are taken in an electronic control circuit mainly consisting of a microcomputer. When conditions of stopping the engine are fulfilled, the functions of ignition means and a fuel system are stopped to thereby stop the engine, and when conditions of rotatably starting the engine are fulfilled, a starter is rotated to start the engine, so that the rotation of the engine can be maintained.

For example, primay check indicating lamps including a charge warning lamp, an oil pressure lamp, an exhaust gas temperature lamp and the like is turned "ON", when an ignition key switch is turned "ON", turned "OFF" when the engine is cranked and enters into full rotation, and turned "ON" when the engine is in an engine failure. When the primary check indicating lamps operable as described above are applied to EASS, the primary check indicating lamp are turned "ON", if the engine is automatically stopped at the time of EASS being set. When the engine is automatically stopped at the time of EASS being set, a lamp indicating an automatic stop is turned "ON". Nevertheless, when the engine is automatically stopped, all the primary check lamps are turned "ON" at once, so that a driver may feel uneasy.

SUMMARY OF THE INVENTION

The present invention has been developed to obviate the above-described disadvantages of the prior art and has as its object the provision of an automatic engine stop-restart system wherein, when an engine is automatically stopped during a function of automatically stopping and restarting the engine is set, primary check indicating lamps are prevented from being turned "ON", thereby enabling to secure safety.

According to the present invention, the engine is automatically stopped under predetermined conditions, thereafter, automatically restarted under other predetermined conditions, and primary check indicating means for indicating any abnormality in various components of a vehicle is forcedly turned "OFF" at least when the engine is automatically stopped. The primary check indicating means includes a charge warning lamp indicating an abnormality in an generating condition, an oil pressure lamp indicating an abnormality in the pressure of lubricating oil and an exhaust gas temperature lamp indicating an abnormality in the temperature of exhaust gas, for example.

BRIEF DESCRIPTION OF THE DRAWINGS

FIG. 1 is a block diagram showing an example of the general arrangement of the automatic engine stop-restart system according to the present invention;

FIG. 2 is a block diagram showing the embodiment thereof in detail including a circuit;

FIG. 3 is a block diagram showing the logic of the condition of turning "OFF" the oil pressure lamp; and FIG. 4 is a block diagram showing the logic of the condition of turning "OFF" the charge warning lamp.

DESCRIPTION OF THE PREFERRED EMBODIMENT

FIG. 1 is a block diagram showing the general arrangement of one embodiment of an automatic engine stop-restart system according to the present invention. In the drawing, an electronic control circuit 1 mainly consists of a microcomputer of 8 bits for example. In order to cause this electronic control circuit 1 to perform functions (hereinafter referred to as "ERS") of automatically stopping the engine, and thereafter, automatically restarting the engine, it is necessary to press a main switch 3 after the engine 2 has been started. The main switch 3 should be pressed again to manually release ERS which has been once set. On the other hand, when predetermined conditions are fulfilled, ERS is automatically released. As such predetermined conditions include, opening of a door of a driver's seat, manual operation of a starter upon automatically stopping the engine and the like, for example.

Brief description will now be given of an embodiment of the general arrangement of the automatic engine stop-restart system according to the present invention. The engine 2 is provided thereon with a water temperature sensor 6 for detecting whether the engine cooling water temperature is within a predetermined range or not and with an oil pressure switch 7 for detecting whether the oil pressure of the engine has reached a satisfactory level or not. Reference numeral 8 indicates an igniter for generating a high voltage for sparks igniting ignition plugs. An ON-OFF signal of this igniter 8 is fed to the control circuit 1 to detect an engine rotational speed. Signals from the water temperature sensor 6 and the oil pressure sensor 7 are taken into the control circuit 1. Similarly to the foregoing description, the engine 2 is provided thereon with a starter 9, which cranks the engine 2 to start it.

Reference numeral 10 indicates a clutch pedal, which is provided therearound with a clutch upper switch 10U interlocking with this clutch pedal 10 and a clutch lower switch 10L. Openings or closings of the clutch upper switch 10U and the clutch lower switch 10L transmit the depressed state of the clutch pedal 10 to the control circuit 1. More specifically, the clutch lower switch 10L is turned ON when the clutch pedal 10 is substantially fully depressed, and the clutch upper switch 10U is turned ON when clutch pedal 10 is depressed to a predetermined percentage of the full stroke of the clutch pedal, e.g., 30% of the full stroke. Furthermore, in an indicator panel 11, there are provided an operation indicating lamp 11G, an engine stop indicating lamp 11Y, a speedometer 11S as a vehicle speed sensor, primary check indicating lamps 11P and other indicating means. An indication signal $S_{01}$ from the control circuit 1 is fed to the lamps 11G and 11Y to turn ON or OFF. A vehicle speed signal $S_{11}$ from the vehicle speed sensor 11S is taken into the control circuit 1. Taken in the control circuit 1 as necessary are signals from sensors, switches and the like including a changeover switch 12 for charging a battery with an output from an alternator, a magnet switch 13 for controlling the operation of an air conditioner, a head lamp switch 14 for ON-OFF operating the head lights, a wiper switch 15 for detecting the operating condition of the wiper, a door switch 16 for detecting the open or closed state of the door of the driver's seat, a turn signal switch 17 for detecting the rights turning condition of the vehicle (the left turning condition of the vehicle under the "keep to the right" ordinance), a slope sensor 18 for detecting whether the slope of the road surface on which the vehicle is stopped is a predetermined value, e.g., 2° or more, and being turned ON when the slope is a predetermined value or more, an idle switch 19 for detecting whether the engine is in idling or not, and being turned ON when the engine is in idling, and a defogger switch 20 for detecting whether the defogger is in operation or not. Furthermore, a starter relay 21 is adapted to be operated by a starter starting signal $S_{ST}$ fed from the control circuit 1, and similarly, a fuel cut relay 22A and ignition cut relay 22B is adapted to be operated by an engine stop signal $S_{TP}$ fed from the control circuit 1. In addition, the relay 22A is used for controlling the energized condition of a fuel cut solenoid and the relay 22B is used for controlling a current to the igniter 8.

Brief description will hereunder be given of action of the automatic engine stop-restart system with the above-described embodiment. Firstly, the engine is manually started and the main switch 3 is pressed to set ERS.

Subsequently, when all the following conditions are fulfilled, the engine 2 is automatically stopped.

(1) The clutch pedal 10 is not depressed.
(2) The engine 2 is in idling, e.g., the rotational speed is 850±50 rpm or less.
(3) The vehicle is stopped, i.e., the vehicle speed $S_{11}$ is not varied for 2 sec, that is, 0.35 Km/h or less.
(4) A right turn signal has not issued from the turn signal switch 17.
(5) The head lamp switch 14 has not turned the head lamps ON (except for small head lamps).
(6) The wiper switch 15 is not in use (except for the intermittent operation).
(7) The water temperature sensor 6 is in OFF condition, i.e., the engine cooling water temperature is within the range of 75°±5° C.~105°±3° C. for example.
(8) The magnet switch 13 for controlling operation of a compressor for the air conditioner is OFF.
(9) A predetermined period of time after the start of the engine by ERS, e.g., 4 sec has elapsed.
(10) The slope sensor 18 is OFF.
(11) The idle switch 19 is OFF.
(12) The defogger switch 20 is OFF.
(13) The vehicle is not held stopped after the ERS is set.

All these conditions are fulfilled, the engine stop indicating lamp 11Y of the indicator panel 11 is turned ON to indicate the automatic stop of the engine.

The automatic stop of the engine 2 is effected by denergizeing the fuel cut solenoid and cutting OFF the ignition power source for feeding current to the igniter 8 for a predetermined period of time, e.g., 1 sec.

Description will now be given of operation of the automatic engine restart.

When the engine 2 is stopped after ERS has been set, if the clutch pedal 10 is substantially fully depressed to turn the clutch lower switch 10L ON, the starter relay 21 is energized to supply a current to the starter 9, so that the engine 2 can be restarted. Additionally, a signal from the clutch lower switch 10L is detected while the clutch is disconnected. When the engine rotational speed reaches a predetermined value, e.g., 450±50 rpm after the engine 2 has been restarted, the starter relay 21 is deenergized to cut off the current supply to the starter 9.

FIG. 2 shows an example of a detailed arrangement of the system according to the present invention. In FIG. 2, same reference numerals as shown in FIG. 1 are used to designate same or similar components, so that detailed description thereof will be omitted.

In this embodiment, the primary check indicating lamps 11P are provided with three lamps 111, 112 and 113. Respective terminals of a charge warning lamp 111, an oil pressure lamp 112 and an exhaust gas temperature lamp 113 are made common and connected to a positive electrode of a battery 25, the other terminals of the charge warning lamp 111 and the oil pressure lamp 112 are connected to terminals $T_1$ and $T_2$ of a control circuit 1, respectively, and the other end of the exhaust gas temperature lamp 113 is connected to a lamp terminal 31 of an electronic control unit 30 for emission control. An L terminal 32 of this electronic control unit 30 for emission control is connected to an emission control terminal $T_3$ of the control circuit 1.

Description will hereunder be given of action of this embodiment with the above-described arrangement with reference to FIGS. 3 and 4. FIG. 3 is a logical diagram for controlling the oil pressure lamp 112, and FIG. 4 is a logical diagram showing the turn-OFF condition of the charge warning lamp 111 and the exhaust gas temperature lamp 113.

The oil pressure lamp 112 is one of the primary check indicating lamps 11P, and, when the engine 2 falls into a failure, the oil pressure switch 7 is turned ON, thereby to turn ON the oil pressure lamp 112. However, when the engine 2 is automatically stopped while ERS is set, the oil pressure lamp 112 will not be turned ON, even if the oil pressure switch 7 is turned ON. Judging whether or not the engine 2 is automatically stopped as described above, or whether or not the engine 2 is automatically restarted upon an automatic stop is made in the control circuit 1 through the logical arrangements shown in FIG. 3. More specifically, in a block 40, there is set an input signal to be fed to an OR circuit 44 when the engine rotational speed is less than 450±50 (rpm) for example; in a block 41, there is set an input signal to be fed to the OR circuit 44 when the ignition is cut; in a block 42, there is set an input signal to be fed to the OR circuit 44 while the engine is cranked by ERS, or before the engine rotational speed exceeds 650±50 (rpm), for example, upon completion of the cranking; and in a block 43, there is set an input signal to be fed to the OR circuit 44 when the oil pressure switch 47 does not continue to be ON more than 1 sec for example. These signals are fed to the OR circuit 44, from which an OR output is fed to a block 45. Upon receiving through the OR circuit 44 a signal from any one of the blocks indicating that the engine 2 is automatically stopped, or the engine 2 is being restarted upon an automatic stop the block 45 acts to turn OFF the oil pressure lamp 112.

Same reference numerals as shown in FIG. 3 are used in FIG. 4, which is control block diagram for the control of the charge warning lamp 111 and the exhaust gas temperature lamp 113.

More specifically, the charge warning lamp 111 is turned ON when the ignition key switch is ON and the L terminal of a regulator is at a low level (earth level). However, when the engine 2 is automatically stopped, the charge warning lamp 111 is not turned ON, even if the L terminal of the regulator is at the low level. Also, the exhaust gas temperature lamp 113 is turned ON when the ignition key switch is ON and the exhaust gas temperature is within a normal range, turned on when the exhaust gas temperature is abnormal, and is not turned ON when the engine 2 is automatically stopped.

Here, a block 46 feeds an input signal to the OR circuit 47 when a signal at a low level is not continuously issued for more than 1 sec from the L terminal of the regulator. Output signals from the blocks 40 through 42 and the block 46 are fed to an OR circuit 47, from which an OR output is fed to a block 48. In the block 48, upon receiving from any one of the blocks a signal indicating that the engine is automatically stopped, or is automatically restarted after the automatic stop, the block 48 acts to forcedly turn OFF the charge warning lamp 111 and the exhaust gas temperature lamp 113 are forecedly turned OFF.

As has been described hereinabove, even if it is judged that the engine is automatically stopped while ERS is set, the primary check indicating lamps 11P are not turned ON.

What is claimed is:

1. An automatic engine stop-restart system for automatically stopping an engine of a motor vehicle under first predetermined conditions and automatically restarting said engine under second predetermined conditions comprising:
    detecting means for detecting operating conditions of various components of said vehicle;
    a control circuit for judging whether or not said first and second predetermined conditions are fulfilled on the basis of detected outputs from said detecting means;
    primary check indicating means having at least one indicator means connected to said detecting means for detecting an abnormal condition of at least one of said various components of said vehicle;
    said control circuit including de-energizing means responsive to at least one of said first and second predetermined conditions for disabling said indicator means when ever said engine is automatically stopped under said first predetermined conditions and maintaining said indicator means disabled at least until said engine has been automatically restarted.

2. An automatic engine stop-restart system as set forth in claim 1, wherein said primary check indicating means includes:
    a charge warning indicator means, for indicating the generating condition of an alternator of said engine;
    an oil pressure indicator means for indicating the pressure of lubricating oil of said engine; and
    an exhaust gas temperature indicator means for indicating the temperature of the exhaust gas of said engine.

3. An automatic engine stop-restart system as set forth in claim 1 or 2, said control circuit further comprising:
    additional means for de-energizing said primary check indicating means responsive to at least one of said first and second predetermined conditions for disabling said indicator means whenever said engine is automatically stopped under said first predetermined conditions and maintaining said indicator means disabled at least until said engine has been automatically restarted.

* * * * *